(12) United States Patent
Yan

(10) Patent No.: US 10,546,406 B2
(45) Date of Patent: Jan. 28, 2020

(54) USER GENERATED CHARACTER ANIMATION

(71) Applicant: Activision Publishing, Inc., Santa Monica, CA (US)

(72) Inventor: Paul D. Yan, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 15/150,205

(22) Filed: May 9, 2016

(65) Prior Publication Data

US 2017/0323467 A1 Nov. 9, 2017

(51) Int. Cl.
*G06T 13/40* (2011.01)
*A63F 13/63* (2014.01)

(52) U.S. Cl.
CPC .............. *G06T 13/40* (2013.01); *A63F 13/63* (2014.09)

(58) Field of Classification Search
CPC .................................. G06T 13/40; A63F 13/63
See application file for complete search history.

(56) References Cited

U.S. PATENT DOCUMENTS

| | | | | |
|---|---|---|---|---|
| 4,346,403 A | * | 8/1982 | Tamura | H04N 5/78 348/576 |
| 4,952,051 A | * | 8/1990 | Lovell | G06T 13/80 345/473 |
| 5,854,634 A | * | 12/1998 | Kroitor | G06T 13/00 345/473 |
| 6,373,492 B1 | * | 4/2002 | Kroitor | G06T 13/00 345/443 |
| 8,055,081 B2 | * | 11/2011 | Luo | G06F 16/58 382/224 |
| 8,237,719 B1 | * | 8/2012 | Trezevant | G06T 13/00 345/473 |
| 9,760,803 B2 | * | 9/2017 | Kulick | G06K 9/6267 |
| 2003/0168984 A1 | * | 9/2003 | Segan | G09F 27/00 315/1 |
| 2004/0010398 A1 | * | 1/2004 | Noma | G06F 17/5095 703/1 |
| 2006/0167630 A1 | * | 7/2006 | Noma | G06F 17/5095 701/117 |
| 2007/0186164 A1 | * | 8/2007 | Getsch | H04N 1/2166 715/723 |
| 2009/0195544 A1 | * | 8/2009 | Wrinch | G06T 13/40 345/473 |
| 2010/0225648 A1 | * | 9/2010 | Katsambas | G06T 13/00 345/427 |
| 2013/0013591 A1 | * | 1/2013 | Hu | G06F 17/30265 707/723 |
| 2013/0021348 A1 | * | 1/2013 | Corazza | G06T 13/40 345/473 |

(Continued)

OTHER PUBLICATIONS

Sanino, Animation Skeleton Walking Eight Walking Frames Stock Vector 312175286 Shutterstock, Sep. 3, 2015, pp. 3.*

(Continued)

*Primary Examiner* — Phuc N Doan

(74) *Attorney, Agent, or Firm* — Klein, O'Neil & Singh, LLP

(57) ABSTRACT

Images of user drawn virtual characters, virtual objects, or virtual scenes may be used in providing display of animations. The animations may be displayed over other images or in a virtual world of video game play.

18 Claims, 13 Drawing Sheets

(56) References Cited

U.S. PATENT DOCUMENTS

2014/0229809 A1* 8/2014 Matsuura .............. G06F 17/211
715/202
2016/0358365 A1* 12/2016 Sumner .................. G06T 13/40

OTHER PUBLICATIONS

Fmalan, How to batch separate & crop multiple scanned photos, URL: http://francoismalan.com/2013/01/how-to-batch-separate-crop-multiple-scanned-photos/ , 2013 (Year: 2013).*

* cited by examiner

USER GENERATED CHARACTER ANIMATION

BACKGROUND OF THE INVENTION

The present invention relates generally to free form user defined aspects of virtual items, and more particularly to video presentation of free form user defined aspects of virtual items, for example virtual characters, objects or aspects of a virtual world, which may be of or for a video game.

Virtual characters and virtual objects are ubiquitously used in a variety of computer related scenarios. Virtual characters may be used in a variety of settings, whether as an adjunct to computer software functions or as a primary component of a software application. For example, a virtual character may be an avatar providing assistance for a computer software office productivity application, or the virtual character may be a user controlled character for a video game. For video games, the virtual character may be in and interacting with a virtual world, with the character possibly wielding virtual objects in doing so.

Often, a user may be constrained in characteristics and features of the virtual characters, or for that matter virtual objects and a virtual world itself. The user may be limited to use of a predefined virtual character, or may be limited to selection of predefined characteristics or aspects of the virtual character. Similarly, a user may be able to select particular predefined objects or even select from particular predefined worlds or spaces, for example related to a use or presence of a virtual character.

In such cases, creativity of the user is necessarily confined, and user enjoyment of a computer, whether for play or work, may suffer.

BRIEF SUMMARY OF THE INVENTION

Aspects of the invention provide for use of user defined virtual characters, virtual objects, and/or virtual spaces or worlds.

Some aspects of the invention provide a method of providing a video animation, comprising: obtaining information of a plurality of poses of a virtual character, including by receiving an image of a scene, taken by an imaging device, including visual representations of the virtual character in the plurality of poses; ordering, by a processor, at least some of the poses in an ordered sequence of poses; and displaying an animation of the virtual character on a display device, the animation of the virtual character including display of the virtual character in the ordered sequence of poses.

Some aspects of the invention provide a compute device including at least one processor and associated with an imaging device, the at least one processor configured by program instructions to: obtain information of a plurality of poses of a virtual character in an image taken by the imaging device, the image including user drawn visual representations of the virtual character in the plurality of poses; order at least some of the poses in an ordered sequence of poses; and command display of an animation of the virtual character on a display device, the animation of the virtual character including display of the virtual character in the ordered sequence of poses.

These and other aspects of the invention are more fully comprehended upon review of this disclosure.

DETAILED DESCRIPTION

Figure 1:
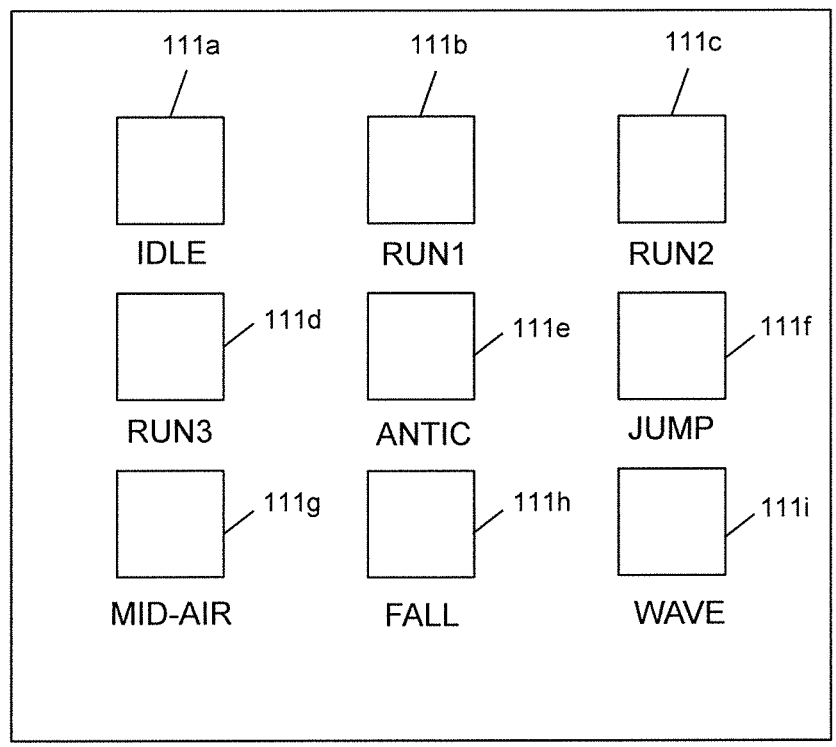
FIG. 1 illustrates a sheet including spaces for user definition of visual characteristics of a virtual character in a variety of postures, which may be considered poses, in accordance with aspects of the invention.

FIG. 1 illustrates a sheet including spaces for user definition of visual characteristics of a virtual character in a variety of postures, which may be considered poses. In many embodiments the sheet may be a sheet of paper. In some such embodiments the spaces for user definition may be outlined in the shape of boxes. In some such embodiments the spaces for user definition may be outlined in the shape of circles. In some such embodiments the spaces for user definition may be outlined in some other shape that clearly identifies to the user the space for user definition of visual characteristics of the virtual character in the variety of postures. In some embodiments the sheet may be in the form of a computer display of a graphical user interface (GUI), with the user able to operate the GUI so as to draw a virtual in various poses in various spaces within the GUI.

In the embodiment of FIG. 1, the sheet includes nine boxes 111a-i. The nine boxes are arranged in a grid, with 3 boxes per row and 3 boxes per columns, but in various embodiments the sheet may include different numbers of boxes and the boxes may be otherwise arranged. Each of the boxes includes a label, for example a first box 111a is labeled "IDLE", a second box 111b is labeled "RUN1", a third box 111c is labeled "RUN2", and a fourth box 111d is labeled "RUN3". As may be seen from the example of the labels for boxes 111*b-d*, a plurality of boxes for related poses may be provided, for example poses pertaining to a single activity of the virtual character.

The user is to draw or otherwise enter a representation of the virtual character in each of the boxes. For example, the user may draw a representation of the virtual character in an idle pose in box 111*a*, a representation of the virtual character in a waving pose in box 111*i*, and representations of virtual character in running poses in boxes 111*b-d*. For the representations of the virtual character running, for example, arms, legs, or other portions of the virtual character may be drawn in different positions, with different degree of extensions, with different expressions, or any of a variety of other differences.

An image may be taken of the sheet with the representations of the virtual character, or the sheet may be otherwise scanned, for example as part of obtaining information of the visual characteristics of the virtual character in different poses. The image information may be processed to determine visual characteristics of the virtual character, and animations of the virtual character may be provided using the pose information. In various embodiments the animations may be displayed on a display device without a background, with a constant background (for example a photographic image or computer generated image), or with a background that may vary over time (for example from a camera providing video images or a rendered display of a virtual world of a video game).

Figure 2:
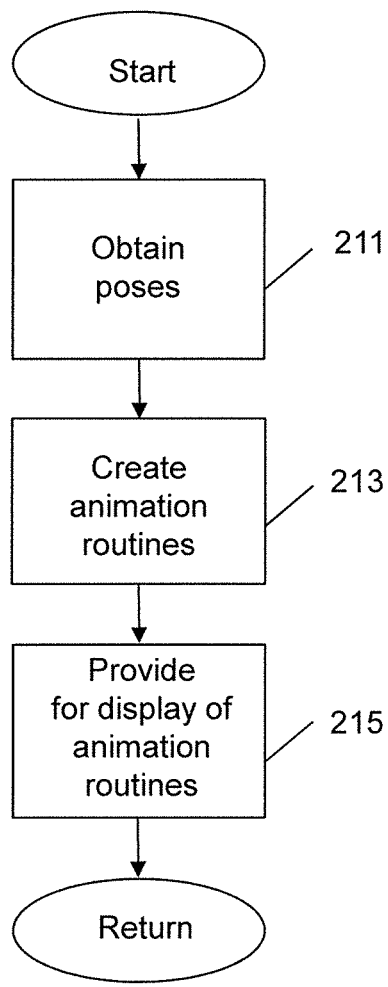
FIG. 2 is a flow chart of a process for providing animations based on user defined visual characteristics.

FIG. 2 is a flow chart of a process for providing animations based on user defined visual characteristics. In some embodiments the process is performed by a compute device with a processor and an associated imaging device. In some embodiments the compute device is a computer with an associated camera. In some embodiments the compute device is a personal computer with an associated web camera. In some embodiments the compute device is a game console with an associated camera. In some embodiments the compute device is a smartphone or a compute tablet. In some embodiments the process is performed in part by a first compute device and in part by a second compute device. For example, in some embodiments the first compute device is a smartphone and the second compute device is a game console, with the smartphone providing data to the game console. Also for example, in some embodiments the first compute device is a smartphone and the second compute device is a server, with the smartphone and server in data communication. In some embodiments the process is performed in part by a first compute device, in part by a second compute device, and in part by a third compute device. For example, in some embodiments the first compute device is a smartphone, the second compute device is a server, and the third compute device is a game console, with the smartphone providing data to the server and the server providing further data to the game console.

In block 211 the process obtains information of a plurality of poses. In some embodiments the poses are poses for a virtual character. In some embodiments the information of the plurality of poses is obtained by obtaining an image including the plurality of poses. In some embodiments the image is processed to determine visual characteristics of a virtual character for each of the poses. In some embodiments each of the poses are classified as being of a particular pose. For example, in some embodiments each of the poses is classified as being one of a particular type of pose, with the different types of poses being predefined in some embodiments. In some embodiments each pose is classified in accordance to a spatial relationship with other poses, for example an uppermost left pose may be classified as an idle pose while a lowermost right pose may be classified as a waving pose. In some embodiments each pose is classified in accordance with a label associated with the pose in the image. For example, in some embodiments a label providing classification information is provided under (or over or within, etc.) an area provided for drawing of a pose.

In block 213 the process creates animation routines. In some embodiments the process creates animation routines by ordering selected poses in a sequence. For example, in some embodiments the process creates a running animation sequence by ordering poses with a running label in a sequence. Using the example of the poses of FIG. 1, a running animation routine may be a sequence of the poses RUN1, RUN2, RUN3, RUN2, RUN1, etc. The example of the running animation is of a sequence of related poses, but in various embodiments the animation routines need not be of related poses. For example, an animation routine could variously include a character running, then waving, then jumping, or various other character activities for which poses have been provided.

In some embodiment the process creates intermediate character poses, providing a transition between provided character poses. For example, in some embodiments the process interpolates between positions of common character parts in different poses to create intermediate character poses, and includes the intermediate character poses in the animation routines.

In some embodiments the process creates a single animation routine. In some embodiments the process creates a plurality of animation routines. In some embodiments the process may create the animation routines and store them in memory, for example for later use. In some embodiments the process may create the animation routines as animation routines are necessary or desired, for example during execution of play of a video game.

In block 215*d* the process provides for display of the animation routines. In some embodiments the process commands a display device to display the animation routines in a predefined sequence. In some embodiments the process commands the display device to display animation routines based on other information, for example user input information.

The process thereafter returns.

Figure 3:
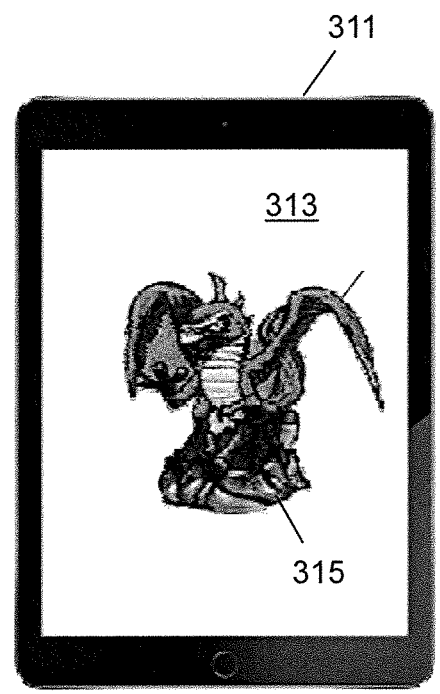
FIG. 3 illustrates a smartphone displaying a frame of an animation routine in accordance with aspects of the invention.

FIG. 3 illustrates a smartphone 311 displaying a frame of an animation routine on its display 313 in accordance with aspects of the invention. The smartphone includes one or more processors, which may include one or more processor cores, any, some or all of which may be simply referred to as a processor. The processor executes program instructions, for example program instructions to capture images using a camera of the smartphone, to generate animation routines, and to command display of the animation routines. In some embodiments the smartphone performs some or all of the operations of the process of FIG. 2.

The frame of the animation routine shows a virtual character 315. In some embodiments the virtual character is in a one of a plurality of poses, for example as previously discussed. In some embodiments the virtual character is in an intermediate pose, for example as discussed with respect to FIG. 2.

As illustrated in FIG. 3, the virtual character is shown over a blank background. However, in other embodiments a background may be provided by an imaging device, for example a camera, of the smartphone, and the background may be a then current scene imaged by the camera, with the background changing as the scene imaged by the camera changes. In still other embodiments the background may be a prior image, or sequence of images, imaged by the camera. In still yet further embodiments, the background may be a rendered background, for example of a virtual world of a video game.

Figure 4:
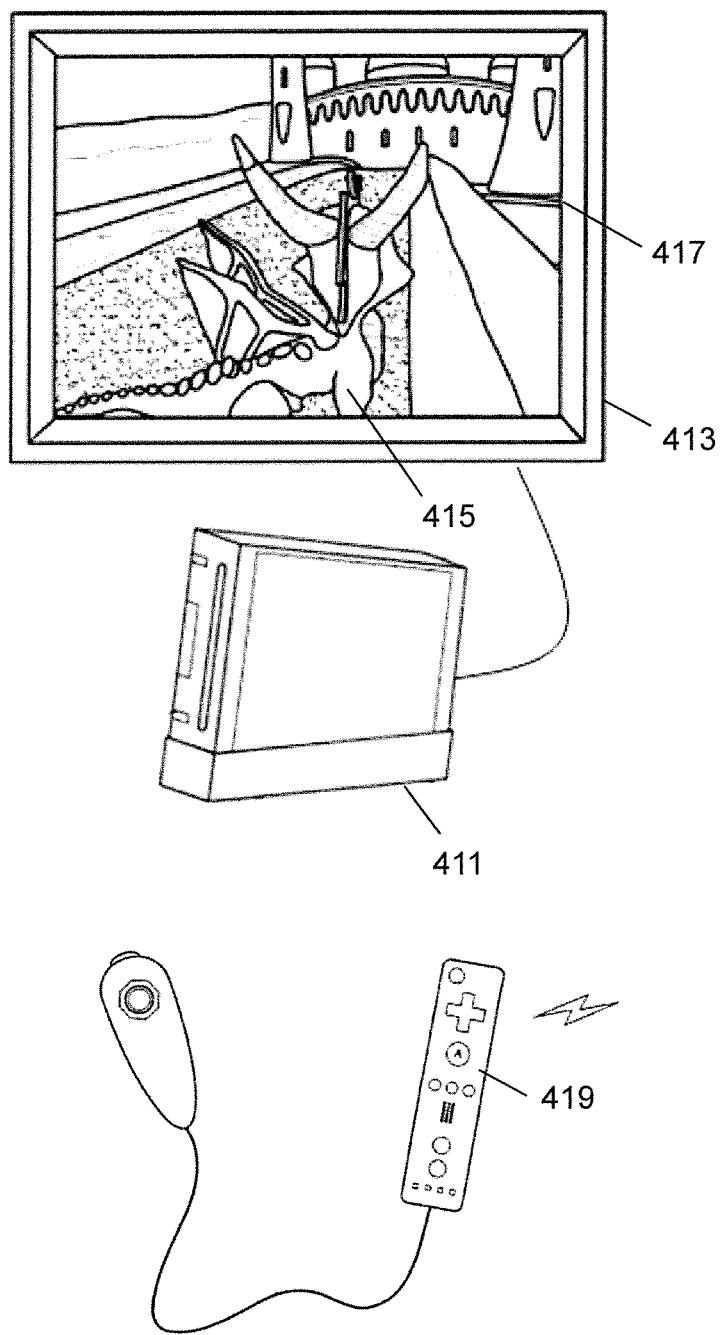
FIG. 4 illustrates a game system displaying a frame of an animation routine on its display in accordance with aspects of the invention.

FIG. 4 illustrates a game system displaying a frame of an animation routine on its display in accordance with aspects of the invention. The game system includes a game console 411. The game console includes one or more processors, which may include one or more processor cores, any, some or all of which may be simply referred to as a processor. The processor executes program instructions, for example program instructions to process images provided to the game console, to generate animation routines, and to command display of the animation routines, for example as part of executing program instructions providing for play of a videogame. In some embodiments the processor may also execute program instructions associated with an imaging device, for example a camera, that in some embodiments may be associated with the game system. In some embodiments the game console performs some or all of the operations of the process of FIG. 2.

The game system also includes a game controller for a user to use in play of the videogame, and a display device 413 to provide displays of videogame action, including the animation routines.

As illustrated in FIG. 4, the display device shows a virtual character 415 in a portion of a virtual world 417 the video game. Generally, a user using the game controller controls the virtual character in and interacting with the virtual world and possibly other inhabitants of the virtual world. In doing so, the virtual character is displayed using at least some, and in some embodiments using only, animation routines formed using user defined character poses, for example the character poses discussed with respect to FIGS. 1 and 2.

Figure 5:
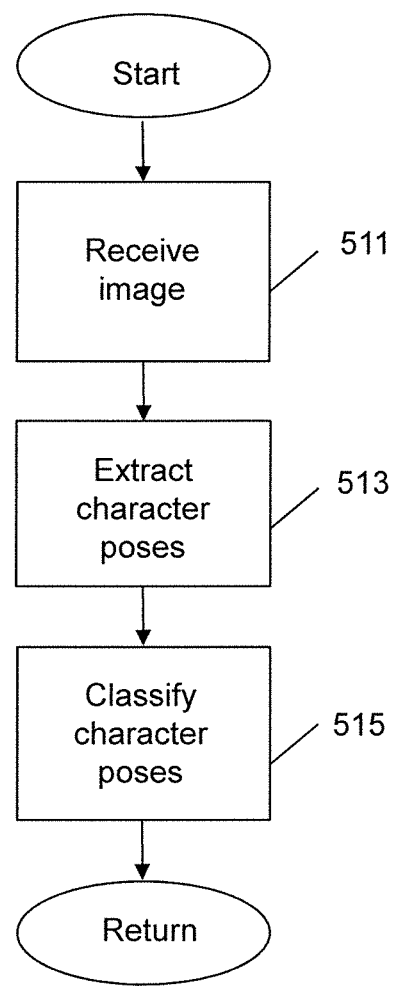
FIG. 5 is a flow chart of a process for obtaining information of a plurality of poses in accordance with aspects of the invention.

FIG. 5 is a flow chart of a process for obtaining information of a plurality of poses in accordance with aspects of the invention. In some embodiments the process is performed by one or more compute devices, for example the compute devices discussed with respect to FIG. 2. In some embodiments the process is performed by one or more processors of one or more of the compute devices discussed with respect to FIG. 2. In some embodiments the process performs operations of block 211 of the process of FIG. 2.

In block 511 the process receives an image including a plurality of poses of a virtual character with user defined visual characteristics. In some embodiments the image is an image of a sheet having user drawn character poses. In some embodiments the image is an image of the sheet of FIG. 1, or in accordance with discussion of the sheet of FIG. 1. In some embodiments the image is an image of a scene taken by an imaging device, for example a camera, with the scene including the plurality of poses of the virtual character with user defined visual characteristics. In some embodiments, however, a plurality of images may be received, with each image including only a single pose or a subset of poses of the plurality of poses of the virtual character with user defined visual characteristics.

In block 513 the process extracts character poses from the image. In some embodiments the process determines locations of character poses in the image and determines features of the character poses at those locations. In some embodiments the process determines locations of character poses in the image by determining a portion of the image including a sheet, and determining locations of predefined areas within the sheet. In some embodiments the process determines locations of predefined areas within the sheet by identifying portions of the image including registration marks on the sheet. In some embodiments the registration marks comprise portions of box outlines on the sheet.

In some embodiments the process determines features of the character poses using edge detection techniques. In some embodiments the process determines features of the character poses by determining inner edges and outer edges of bounded curves in locations including character poses, with outer edges of the bounded curves representing edges of a character pose. In some embodiments the bounded curves are user defined, for example by a user drawing a figure on a sheet.

In block 515 the process classifies the extracted character poses. In some embodiments the process classifies the extracted character poses by correlating a position of a particular pose on the sheet with a predetermined pose. In some embodiments the process classifies the extracted character poses using labels associated with the character poses. In such embodiments the labels may be text on the sheet, with the text recognized using optical character recognition techniques, edge detection techniques, or other techniques.

The process thereafter returns.

Figure 6A:
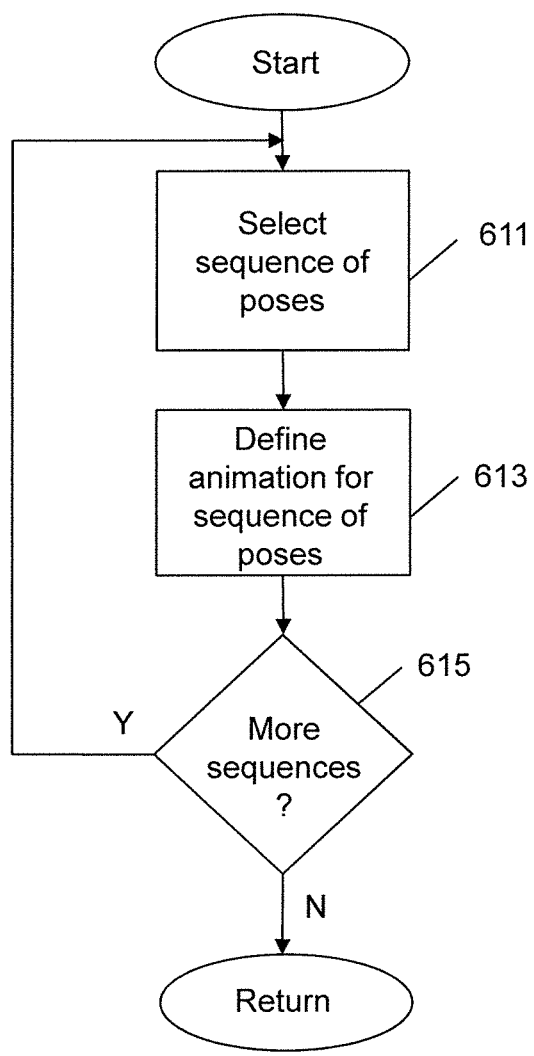
FIG. 6A is a flow chart of a process for creating animation sequences in accordance with aspects of the invention.

FIG. 6A is a flow chart of a process for creating animation sequences in accordance with aspects of the invention. In some embodiments the process is performed by one or more compute devices, for example the compute devices discussed with respect to FIG. 2. In some embodiments the process is performed by one or more processors of one or more of the compute devices discussed with respect to FIG. 2. In some embodiments the process performs operations of block 213 of the process of FIG. 2.

In block 611 the process selects a sequence of user defined poses of a character. In some embodiments the poses are poses determined by the process of FIG. 5. In some embodiments the sequence of poses is a predefined sequence of poses. In some embodiments the sequence of poses is selected based on a user input, for example a user input of a game controller. In such embodiments, for example, the user input from the game controller may indicate that a virtual character should jump, or run, or take some other action, and the selected poses may be poses consistent with such activity by the virtual character.

In block 613 the process defines an animation for the sequence of poses. In some embodiments the animation is defined by the sequence of poses. In some embodiments the animation includes the sequence of poses and intermediate poses between at least some of the poses of the sequence of poses.

In block 615 the process determines if additional sequence of poses are to be selected. If so, the process goes to block 611. Otherwise the process returns.

Figure 6B:
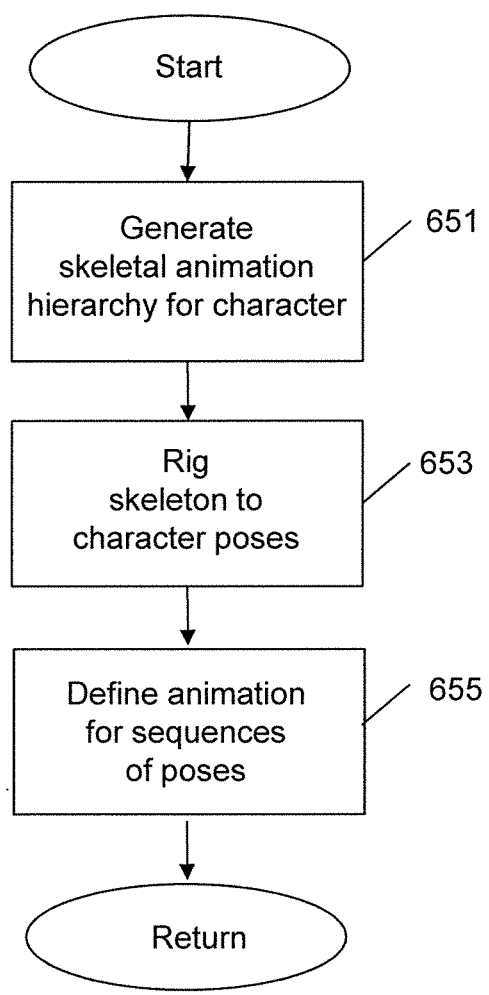
FIG. 6B is a flow chart of a further process for creating animation sequences in accordance with aspects of the invention.

FIG. 6B is a flow chart of a further process for creating animation sequences in accordance with aspects of the invention. In some embodiments the process is performed by one or more compute devices, for example the compute devices discussed with respect to FIG. 2. In some embodiments the process is performed by one or more processors of one or more of the compute devices discussed with respect to FIG. 2. In some embodiments the process performs operations of block 213 of the process of FIG. 2.

In block 651 the process generates a skeletal animation hierarchy for a virtual character. In some embodiments the process generates a skeletal animation hierarchy by mapping bone information from a predefined set of bones to a user defined character. In some embodiments the user defined character is a character with visual characteristics defined by a user, for example by way of a user drawing on a sheet such as the sheet of FIG. 1. In some embodiments the visual characteristics are determined in block 513 of the process of FIG. 4. In some embodiments the process compares portions of the user defined character to predefined body portions (e.g. torso, arm, leg, head, tentacle, fin, tail), determines bones of the predefined body portions, and maps bone information of the predefined body portions to the portions of the user defined character.

In block 653 the process rigs the skeleton to the virtual character in different poses. In some embodiments the different poses are the poses classified by the process of FIG. 5.

In block 655 the process defines animation for sequences of poses of the virtual character. In some embodiments the sequence of poses are a predefined sequence of poses. In some embodiments the sequence of poses are activities expected to be performed by a virtual character in a video game.

The process thereafter returns.

Figure 7:
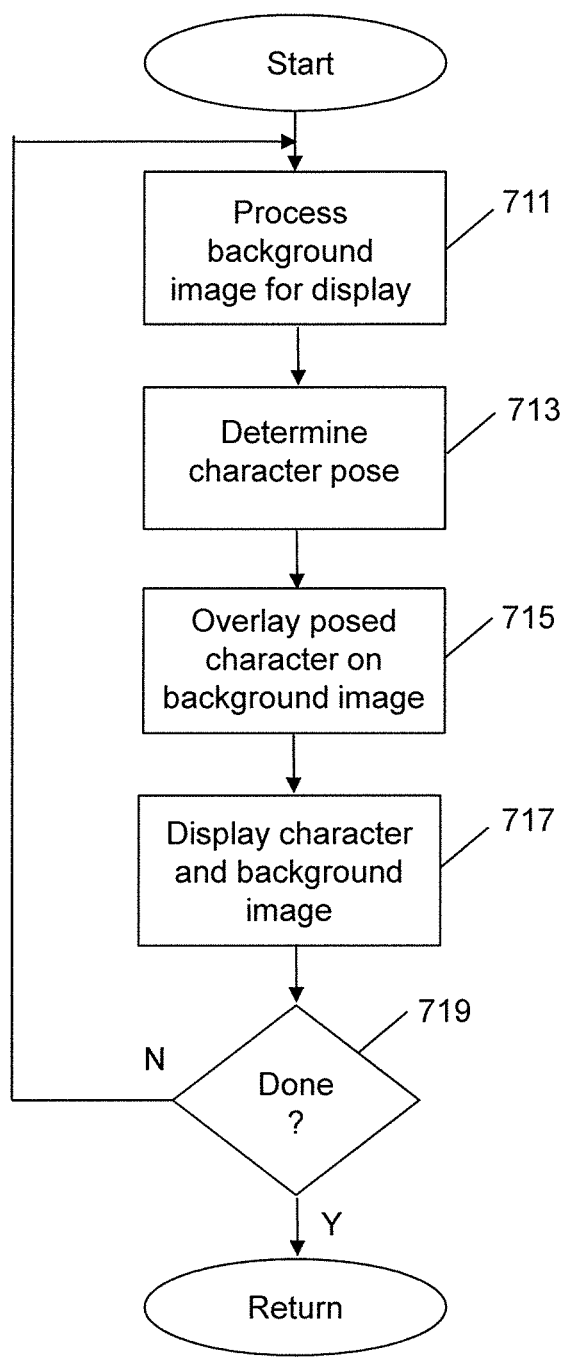
FIG. 7 is a flow chart of a process for providing for display of animation routines in accordance with aspects of the invention.

FIG. 7 is a flow chart of a process for providing for display of animation routines in accordance with aspects of the invention. In some embodiments the process is performed by one or more compute devices, for example the compute devices discussed with respect to FIG. 2. In some embodiments the process is performed by one or more processors of one or more of the compute devices discussed with respect to FIG. 2. In some embodiments the process performs operations of block 215 of the process of FIG. 2.

The process of FIG. 7 shows a looping process that provides a display of animated virtual character against a background image. Each iteration of the loop may provide a single frame of a displayed video, or, depending on frame display times, multiple frames of the displayed video In block 711 the process processes a background image for display. In some embodiments the background image is an image of a scene recorded by an imaging device, for example a camera of a smartphone or tablet compute device. In some such embodiments the process may store the image of the scene in a memory. In some embodiments the background image is a then current image of a scene recorded by the camera. In some embodiments the background image may be a previously captured image of a scene.

In block 713 the process determines a character pose for a virtual character. The determined character pose is one character pose of a sequence of character poses, for example of a sequence of character poses determined by the process of FIG. 6A.

In block 715 the process overlays the virtual character in the determined character pose on the background image. In some embodiments the process overlays the virtual character on the background image by overwriting portions of memory of the background image with imagery of the virtual character. In some embodiments the operations of block 715 are performed by writing imagery of the virtual character to memory for a display plane having a higher priority than a display plane for the background image. In some embodiments operations of block 715 are performed as part of operations of block 717.

In block 717 the process displays the background image and the virtual character in the determined character pose.

In block 719 the process determines if display of the animated virtual character is complete. If not, the process goes to block 711 and continues. Otherwise, the process returns.

Figure 8:
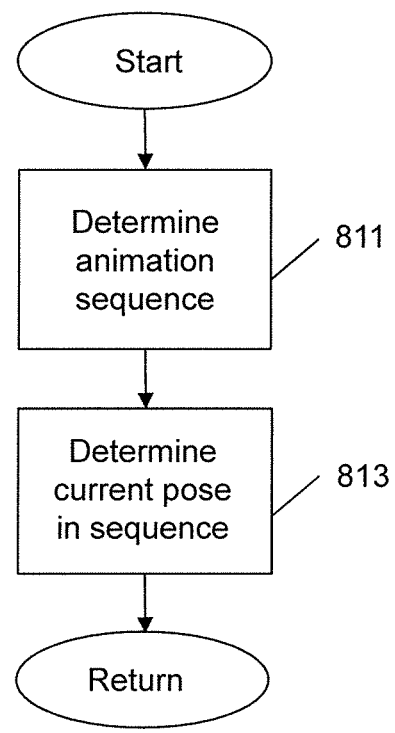
FIG. 8 is a flow chart of a process for determining a character pose for display in accordance with aspects of the invention.

FIG. 8 is a flow chart of a process for determining a character pose for display in accordance with aspects of the invention. In some embodiments the process is performed by one or more compute devices, for example the compute devices discussed with respect to FIG. 2. In some embodiments the process is performed by one or more processors of one or more of the compute devices discussed with respect to FIG. 2. In some embodiments the process performs operations of block 713 of the process of FIG. 7.

In block 811 the process determines an animation sequence being used. In some embodiments the animation sequence is one of the animation sequences defined in block 613 of the process of FIG. 6A. In block 813 the process determines a current pose in the animation sequence.

The process thereafter returns.

Figure 9:
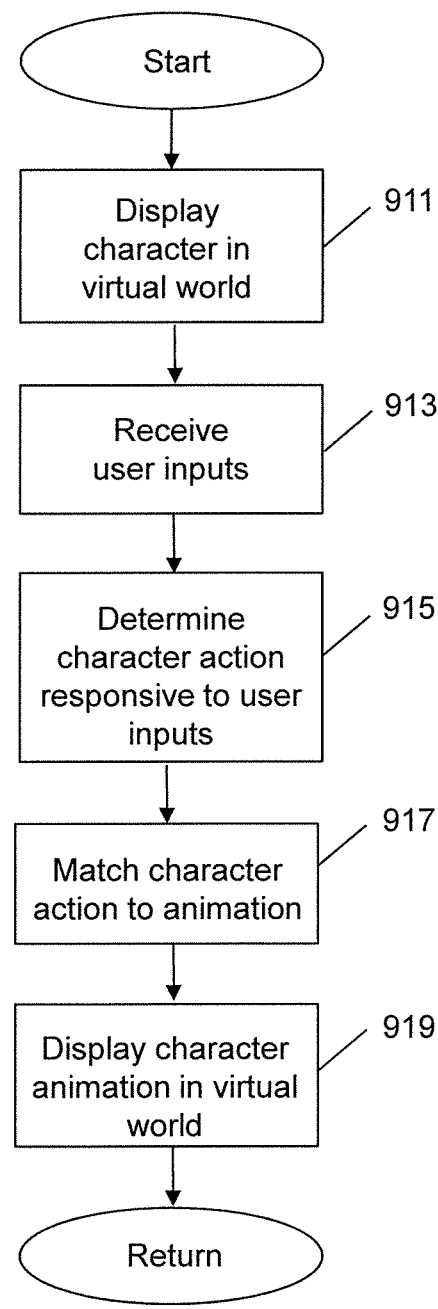
FIG. 9 is a flow chart a further process for providing for display of animation routines in accordance with aspects of the invention.

FIG. 9 is a flow chart a further process for providing for display of animation routines in accordance with aspects of the invention. In some embodiments the process is performed by one or more compute devices, for example the compute devices discussed with respect to FIG. 2. In some embodiments the process is performed by one or more processors of one or more of the compute devices discussed with respect to FIG. 2. In some embodiments the process is performed by a game system, for example the game system of FIG. 4. In some embodiments the process performs operations of block 215 of the process of FIG. 2.

In block 911 the process displays a virtual character in a virtual world. The virtual character may be a character controlled by a user using a game controller, and the virtual world may be a virtual world of videogame play. The user may control the character to interact with and in the virtual world, and possibly with other virtual characters within the virtual world of videogame play.

In block 913 the process receives user inputs, for example from the game controller.

In block 915 the process determines actions of the virtual character responsive to the user inputs. For example, the actions may include running, jumping, waving, or a variety of other actions.

In block 917 the process maps the determined character action to a corresponding animation of the virtual character. The corresponding animation may be an animation defined for a sequence of poses, for example as discussed with respect to block 613 of the process of FIG. 6A or as discussed with respect to block 655 of the process of FIG. 6B.

In block 919 the process displays the animation of the virtual character in the virtual world on a display device.

The process thereafter returns.

Figure 10:
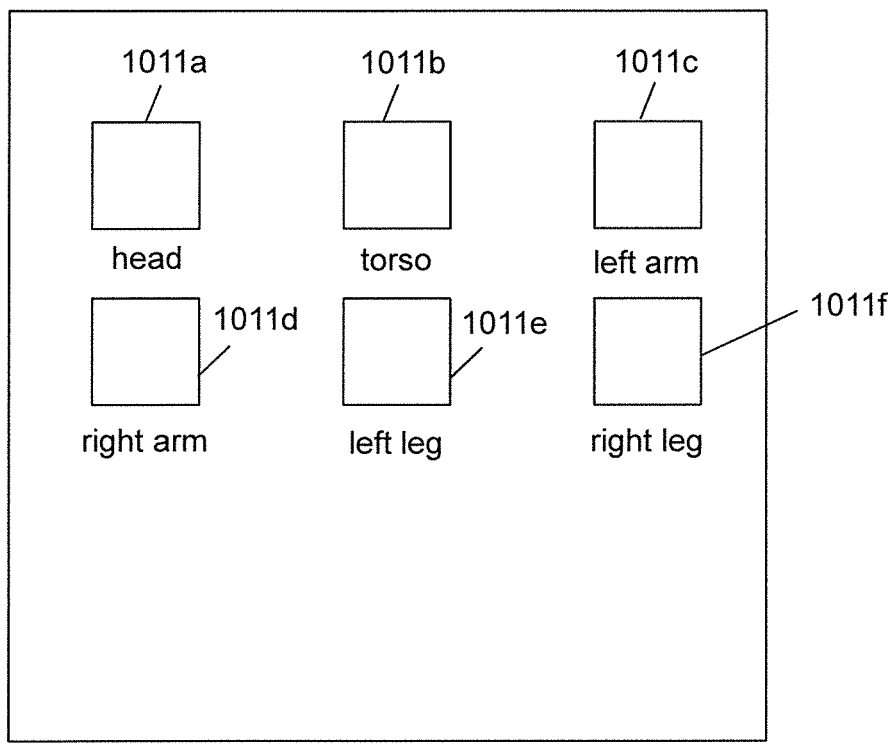
FIG. 10 illustrates a sheet including spaces for user definition of visual characteristics of predefined portions of a virtual character in accordance with aspects of the invention.

FIG. 10 illustrates a sheet including spaces for user definition of visual characteristics of predefined portions of a virtual character in accordance with aspects of the invention. In the embodiment of FIG. 10, the sheet includes a first space 1011a labeled "head", a second space 1011b labeled "torso", a third space 1011c labeled "left arm", a fourth space 1011d labeled "right arm", a fifth space 1011e labeled "left leg", and a sixth space 1011f labeled "right leg". In the embodiment of FIG. 10, the spaces are arranged in two rows each having three columns, but the number of spaces and the arrangement of spaces may vary. For example, the spaces may be arranged in a manner representative of a front view of a virtual character, for example with the "head" space arranged over the "torso" space, etc. Similarly, while the example spaces of FIG. 10 may be considered appropriate for a humanoid form, spaces for other forms may instead be used, for example the "arm" spaces may be replaced by additional "leg" spaces, and a "tail" space may be additionally provided.

Similar to the sheet of FIG. 1, a user is to draw or otherwise enter a representation of portions of the virtual character in each of the boxes. The sheet is then scanned, for example using an imaging device, and the resulting image information is processed, for example using one or more compute devices as discussed with respect to FIG. 2, to determine visual features of different portions of the virtual character. The virtual character may thereafter be animated against a background image or imagery, or used as a virtual character in videogame play.

Figure 11:
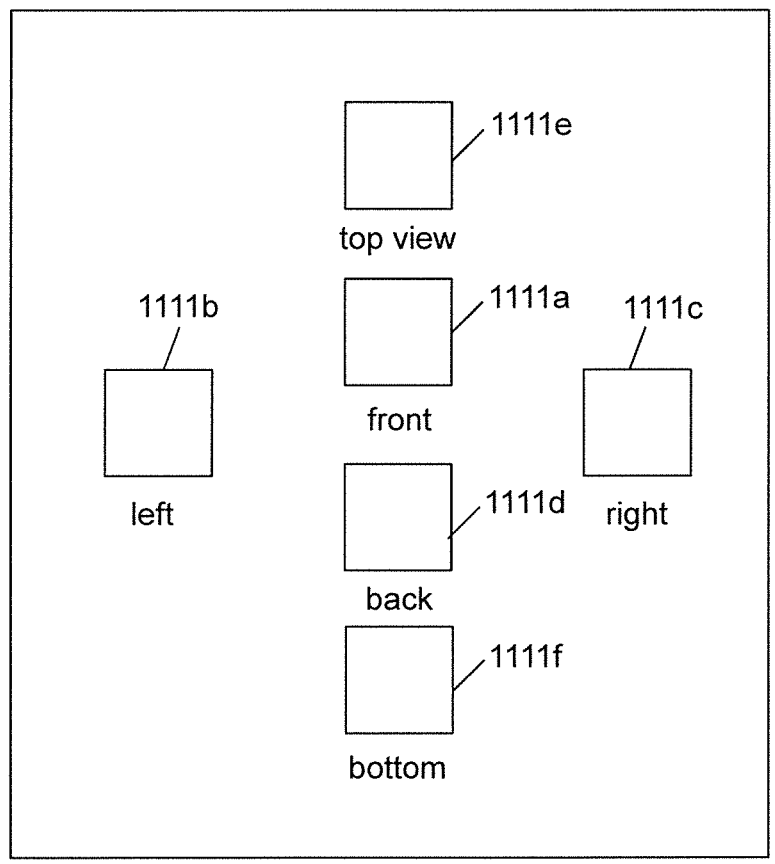
FIG. 11 illustrates a sheet including spaces for user definition of visual characteristics of a virtual object in accordance with aspects of the invention.

FIG. 11 illustrates a sheet including spaces for user definition of visual characteristics of a virtual object in accordance with aspects of the invention. In the embodiment of FIG. 11, the sheet includes a first space 1111a labeled "front", a second space 1111b labeled "left", a third space 1111c labeled "right", a fourth space 1111d labeled "back", a fifth space 1111e labeled "top", and a sixth space 1011f labeled "back". As may be imagined, the various spaces correspond to views of an object, namely a front view, left view, right view, back view, top view, and bottom view, respectively. In the embodiment of FIG. 11, the spaces are arranged largely in accordance with location of the views, with the front and back views centrally located, the left and right views to the left and right, respectively, of the central area, and the top and bottom views above and below, respectively, of the central area.

Similar to the sheets of FIG. 1 and FIG. 10, a user is to draw or otherwise enter a representation of different views of the virtual object in each of the boxes. The sheet is then scanned, for example using an imaging device, and the resulting image information is processed, for example using one or more compute devices as discussed with respect to FIG. 2, to determine visual features of the virtual object. The virtual object may thereafter be used in an animation, either on its own or wielded by a virtual character. Moreover, the virtual object may be so used either against a background image or imagery, or in the context of play of a videogame.

Figure 12A:
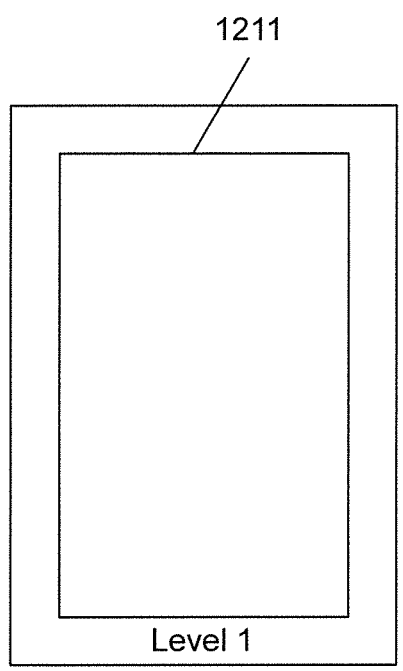
FIG. 12A illustrates a sheet including spaces for user definition of characteristics of a level in a video game in accordance with aspects of the invention.
Figure 12B:
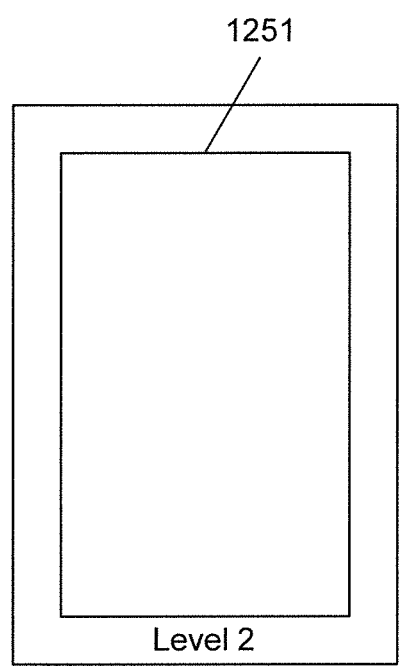
FIG. 12B illustrates a further sheet including spaces for user definition of characteristics of a level in a video game in accordance with aspects of the invention.

FIG. 12A and FIG. 12B each illustrate a sheet in which a user is to draw features of a level of a videogame. For example, FIG. 12A includes a box 1211 having an associated label "Level 1", in which a user is to diagram features of a first level of a video game. Similarly, FIG. 12B includes a box 1251 having an associated label "Level 2", in which a user is to diagram features of a second level of a video game. In some embodiments the features may be drawn as a view from a particular vantage point of a scene of a particular level, for example level 1. Using edge detection methods and/or other image analysis methods a two dimensional scene or a three dimensional scene may be generated from a captured image of the view of the scene. In some embodiments the view from the particular vantage point may be a front view, for example a front perspective view. In some embodiments the view from the particular vantage point may be a top planar view. In some embodiments the two dimensional scene or the three dimensional scene may be used in conjunction with the character or object animations discussed herein. In some embodiments the two dimensional scene or the three dimension scene may be used as part of a virtual world of video game play.

Although the invention has been discussed with respect to various embodiments, it should be recognized that the invention comprises the novel and non-obvious claims supported by this disclosure.

What is claimed is:

1. A method of providing a video animation, comprising:
obtaining information of a plurality of poses of a virtual character by receiving an image of a scene taken by an imaging device;
processing the image to extract:
a plurality of user drawn visual representations of the virtual character from the image, and
a plurality of user defined labels for the plurality of user drawn visual representations, wherein each of the plurality of user drawn visual representations shows the virtual character in one of the plurality of poses, and wherein each of the plurality of user defined labels is descriptive of one of the plurality of user drawn visual representations;
classifying each of the plurality of user drawn visual representations using the extracted plurality of user defined labels;
ordering, by a processor, at least some of the extracted plurality of user drawn visual representations in a predefined animation sequence of user drawn visual representations based on the classified plurality of user drawn visual representations; and
displaying an animation of the virtual character on a display device, wherein the animation of the virtual character includes a display of the virtual character in the predefined animation sequence of user drawn visual representations.

2. The method of claim 1, wherein the image includes a plurality of boxes, each of the plurality of boxes including one of the plurality of user drawn visual representations of the virtual character in one of the plurality of poses, and wherein extracting the plurality of user drawn visual representations comprises extracting an image from within a border of each of the plurality of boxes.

3. The method of claim 2, wherein each of the plurality of boxes comprises at least one of the plurality of user defined labels, and wherein extracting the plurality of user defined labels comprises identifying each of the plurality of user defined labels.

4. The method of claim 1, wherein the predefined sequence of user drawn visual representations comprises the at least some of the plurality of user drawn visual representations.

5. The method of claim 4, wherein the predefined sequence of user drawn visual representations further comprises at least some poses not detected in the image of the scene.

6. The method of claim 5, wherein the at least some additional poses comprise interpolations of two or more poses of the at least some of the plurality of poses.

7. The method of claim 1, wherein the animation of the virtual character is displayed on a background of a further scene viewed by the imaging device, the further scene comprising a then current scene viewed by the imaging device, with the background changing as the further scene viewed by the imaging device changes.

8. The method of claim 7, wherein the virtual character is controlled by a user using a game controller to provide user inputs.

9. The method of claim 1, wherein the animation of the virtual character is displayed in a virtual world of videogame play.

10. The method of claim 9, wherein the virtual character is controlled by a user using a game controller to provide user inputs.

11. A compute device including at least one processor and associated with an imaging device, the at least one processor configured by program instructions to:
obtain information of a plurality of poses of a virtual character in an image taken by the imaging device;
process the image to extract:

a plurality of user drawn visual representations of the virtual character, wherein each of the plurality of user drawn visual representations shows the virtual character in one of the plurality of poses, and a plurality of user defined labels, wherein each of the plurality of user defined labels is descriptive of one of the plurality of poses;

classify each of the plurality of poses using the plurality of user defined labels;

order at least some of the extracted plurality of poses in a predefined animation sequence of poses based on the classification of the plurality of poses; and command display of an animation of the virtual character on a display device, wherein the animation of the virtual character includes display of the virtual character in the predefined sequence of poses.

12. The compute device of claim 11, wherein the compute device comprises a smartphone including the display device and the imaging device.

13. The compute device of claim 11, wherein the compute device comprises a tablet compute device including the display device and the imaging device.

14. The compute device of claim 12 wherein the at least one processor is further configured by the program instructions to command display of the animation of the virtual character on a background comprising a scene being viewed by the imaging device.

15. The compute device of claim 11 wherein the compute device is a game console.

16. The compute device of claim 15 wherein the at least one processor is further configured by the program instructions to command display of the animation of the virtual character in a virtual world of videogame play.

17. The compute device of claim 11, wherein each of the plurality of user defined labels is provided under an area provided for a drawing of a pose of the plurality of poses in the image processed by the processor.

18. The compute device of claim 17, further comprising ordering, in the animation, the at least some of the plurality of poses in a numeric sequence of the plurality of user defined labels.

* * * * *